(12) United States Patent
Ono (10) Patent No.: US 10,183,294 B2
(45) Date of Patent: Jan. 22, 2019

(54) FLUID HANDLING DEVICE

(71) Applicant: Enplas Corporation, Saitama (JP)

(72) Inventor: Koichi Ono, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 15/474,572

(22) Filed: Mar. 30, 2017

(65) Prior Publication Data

US 2017/0282183 A1    Oct. 5, 2017

(30) Foreign Application Priority Data

Mar. 31, 2016    (JP) ................ 2016-071084

(51) Int. Cl.
*B01L 3/00*    (2006.01)
*F16K 99/00*    (2006.01)

(52) U.S. Cl.
CPC ... *B01L 3/502784* (2013.01); *B01L 3/502707* (2013.01); *B01L 3/502715* (2013.01); *F16K 99/0015* (2013.01); *F16K 99/0028* (2013.01); *F16K 99/0042* (2013.01); *B01L 2200/027* (2013.01); *B01L 2200/0652* (2013.01); *B01L 2200/0673* (2013.01); *B01L 2300/0816* (2013.01); *B01L 2300/0864* (2013.01); *B01L 2300/0887* (2013.01); *B01L 2400/0406* (2013.01); *B01L 2400/0415* (2013.01);
(Continued)

(58) Field of Classification Search
CPC ......... B01L 3/502784; B01L 3/502707; B01L 3/502715; B01L 2200/0652; B01L 2400/0487; B01L 2300/0887; B01L 2300/0864; B01L 2200/027; B01L 2400/0415; B01L 2300/0816; B01L 2200/0673; B01L 2400/0406; F16K 99/0015; F16K 99/0028; F16K 99/0042; F16K 2099/0084; F16K 2099/008
See application file for complete search history.

(56) References Cited

U.S. PATENT DOCUMENTS 8,940,147 B1    1/2015 Bartsch et al.
2013/0293246 A1    11/2013 Pollack et al.
(Continued)

FOREIGN PATENT DOCUMENTS

WO    2015/038767 A1    3/2015

OTHER PUBLICATIONS

Extended European Search Report for 17163924.8 dated Jun. 30, 2017.
(Continued)

*Primary Examiner* — Samuel P Siefke
(74) *Attorney, Agent, or Firm* — Brundidge & Stanger, P.C.

(57) ABSTRACT

A fluid handling device includes: a substrate including a first surface and a second surface which are opposite to each other, wherein a first recess which allows fluid to flow therethrough is formed on the first surface; a film including a third surface and a fourth surface which are opposite to each other, wherein at least a pair of second recesses is formed on the third surface; and at least a pair of electrodes whose shape is defined by the second recesses, the electrodes being disposed in the second recesses and configured to apply an electric field to an inside of the first recess, the film being joined to the substrate such that the first surface and the fourth surface face each other.

6 Claims, 5 Drawing Sheets

(52) U.S. Cl.
CPC . *B01L 2400/0487* (2013.01); *F16K 2099/008* (2013.01); *F16K 2099/0084* (2013.01)

(56) References Cited

U.S. PATENT DOCUMENTS

| | | |
|---|---|---|
| 2015/0014170 A1 | 1/2015 | Naisby et al. |
| 2015/0021188 A1 | 1/2015 | Naisby et al. |
| 2015/0174574 A1 | 6/2015 | Chang et al. |
| 2015/0232942 A1 | 8/2015 | Abate et al. |
| 2016/0220995 A1 | 8/2016 | Atashbar et al. |

OTHER PUBLICATIONS

Communication pursuant to Article 94(3) EPC for EP17163924.8 dated Jul. 17, 2018.

FLUID HANDLING DEVICE

CROSS REFERENCE TO RELATED APPLICATIONS

This application is entitled to and claims the benefit of Japanese Patent Application No. 2016-071084, filed on Mar. 31, 2016, the disclosure of which including the specification, drawings and abstract is incorporated herein by reference in its entirety.

TECHNICAL FIELD

The present invention relates to a fluid handling device.

BACKGROUND ART

In recent years, fluid handling devices have been used to accurately and speedily analyze a trace substance such as protein and nucleic acid. Fluid handling devices advantageously allow the amount of reagents or samples required for analysis to be small, and are expected to be used for various uses such as laboratory tests, food tests, and environment tests.

A fluid handling device is known which highly accurately detects a target material (such as a cell, a DNA and an enzyme) included in a micro droplet (hereinafter also referred to as "droplet") which has a diameter of 0.1 to 1000 μm, both inclusive, and is generated from a liquid containing the target material. During generation of droplets, not only a droplet which contains the target material but also a droplet which does not contain the target material can be generated. In view of this, a liquid handling device is known which includes a sorter part for sorting the droplet which contains the target material and the droplet which does not contain the target material (see, for example, PTL 1).

Figure 1:
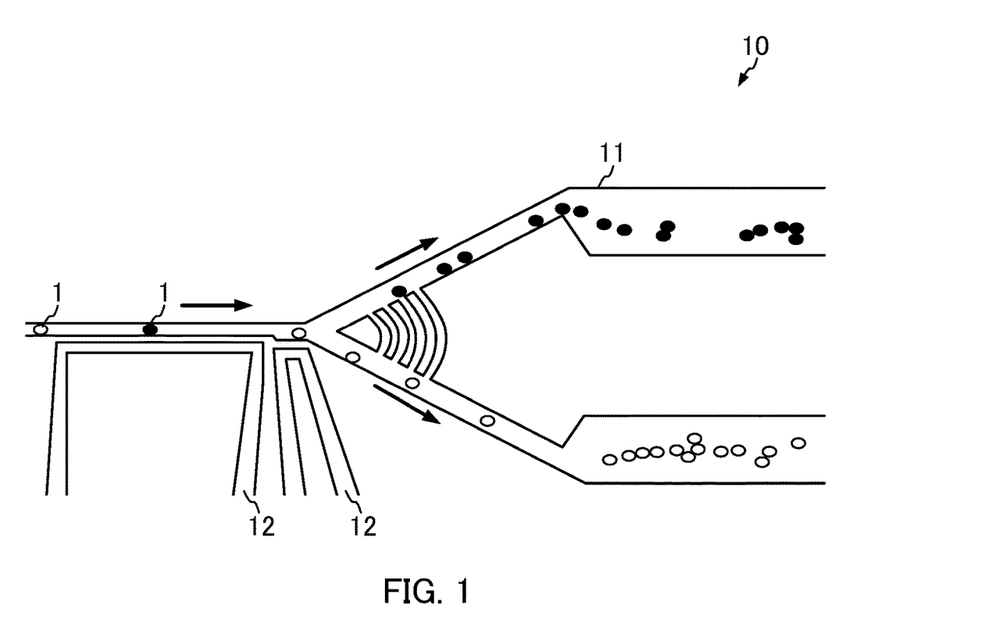
FIG. 1 is a schematic view for describing a function of a sorter part in a liquid handling device disclosed in PTL 1.

FIG. 1 is a schematic view for describing a function of a sorter part of liquid handling device 10 disclosed in PTL 1. As illustrated in FIG. 1, liquid handling device 10 includes channel 11 through which liquid can move, and a pair of electrodes 12 for applying an electric field to the inside of channel 11. The pair of electrodes 12 is arranged along channel 11. In FIG. 1, white droplet 1 represents a droplet which contains a target material, and black droplet 1 represents a droplet which does not contain a target material. In liquid handling device 10, electrode 12 applies an electric field to the inside of channel 11. Droplet 1 having passed through the electric field in channel 11 moves in different directions depending on whether the target material is present. Liquid handling device 10 disclosed in PTL 1 can sort droplet 1 which contains a target material and droplet 1 which does not contain a target material by utilizing dielectric migration.

CITATION LIST

Patent Literature

PTL 1
Japanese Unexamined Patent Application Publication (Translation of PCT Application) No. 2015-533079

SUMMARY OF INVENTION

Technical Problem

For example, a fluid handling device can be manufactured such that a film in which a pair of electrodes are disposed on one surface thereof is joined to a substrate on which a recess which serves as a channel is formed, on the surface on which the recess is formed. The electrode can be formed by applying a composition for forming the electrode having fluidity on the film by printing, and by solidifying the composition. However, in the case where the electrode is formed by printing (for example, screen printing), the composition flows when the composition is applied to the film, and consequently the electrode cannot be accurately formed in some situation. In addition, the pair of electrodes has to be formed with a sufficient distance therebetween for the purpose of preventing the pair of electrodes from making contact with each other, and as a result, the electrodes cannot be disposed at a small interval.

In addition, in the case of a fluid handling device including a substrate in which a recess for channel is formed on one surface and a recess for the electrode is formed on the other surface, and a film which is joined to the one surface of the substrate, it is necessary to closely dispose an end portion of the electrode at a position near the inside of the channel in the thickness direction of the substrate from the viewpoint of applying an electric field to the inside of the channel. In view of this, a recess for the electrode having a high aspect ratio (the depth with respect to the width of the recess) is required to be formed on the substrate, and as a result, the difficulty of the manufacture is increased.

An object of the present invention is to provide a fluid handling device whose electrode can be easily formed with high accuracy, even by printing.

Solution to Problem

To achieve the above-mentioned object, a fluid handling device of an embodiment of the present invention includes: a substrate including a first surface and a second surface which are opposite to each other, in which a first recess which allows fluid to flow therethrough is formed on the first surface; a film including a third surface and a fourth surface which are opposite to each other, in which at least a pair of second recesses is formed on the third surface; and at least a pair of electrodes whose shape is defined by the second recesses, the electrodes being disposed in the second recesses and configured to apply an electric field to an inside of the first recess, the film being joined to the substrate such that the first surface and the fourth surface face each other.

Advantageous Effects of Invention

According to the present invention, it is possible to provide a fluid handling device whose electrode can be highly accurately formed even by a wet process. For example, according to the present invention, it is possible to obtain a fluid handling device having an electrode with a high dimensional precision.

DESCRIPTION OF EMBODIMENTS

Figure 2A:
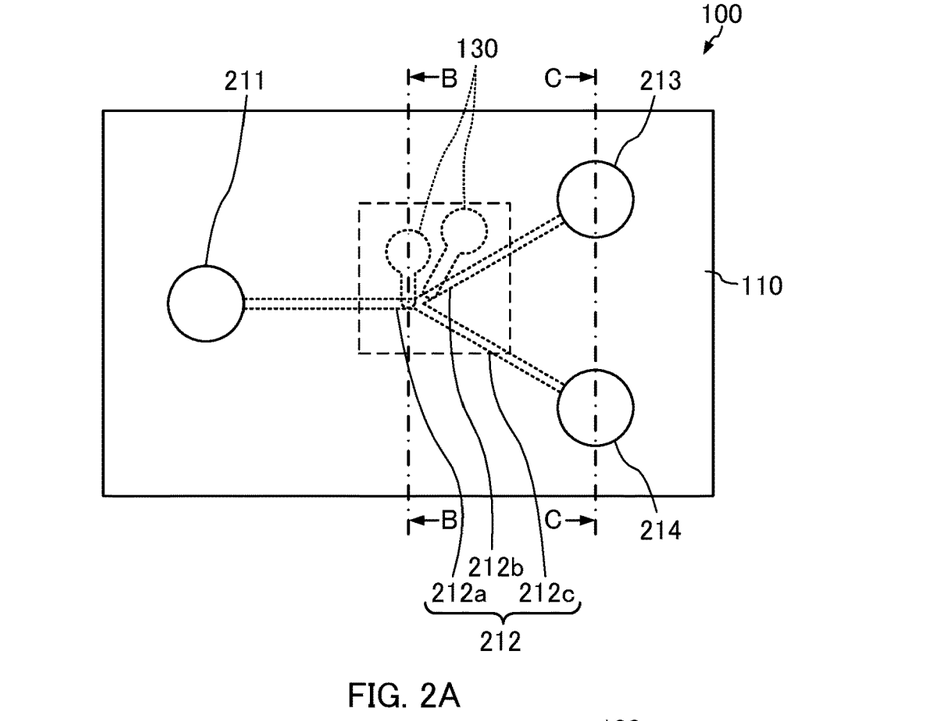
FIG. 2A to FIG. 2C illustrate a configuration of a fluid handling device according to the embodiment.
Figure 2B:
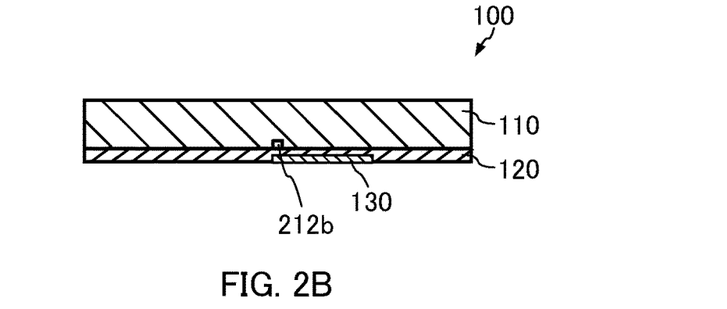
Figure 2C:
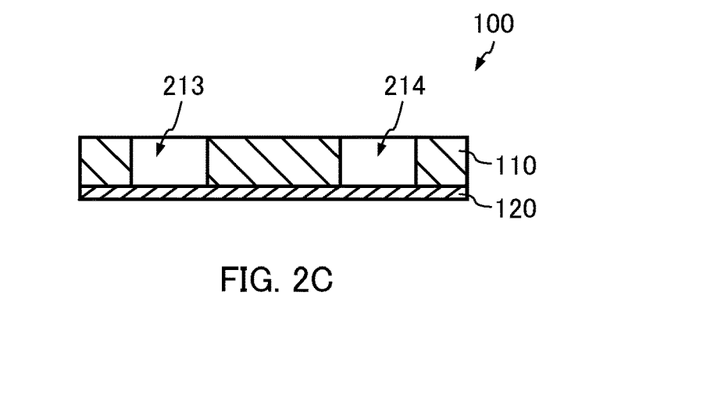

An embodiment of the present invention is described in detail below with reference to the accompanying drawings.
(Configuration of Fluid Handling Device)
FIG. 2A to FIG. 2C illustrate a configuration of fluid handling device 100 according to the present embodiment. FIG. 2A is a plan view of fluid handling device 100, FIG. 2B is a sectional view taken along line B-B of FIG. 2A, and FIG. 2C is a sectional view taken along line C-C of FIG. 2A.

As illustrated in FIG. 2A to FIG. 2C, fluid handling device 100 according to the present embodiment includes substrate 110, film 120 and a pair of electrodes 130.

Figure 3A:
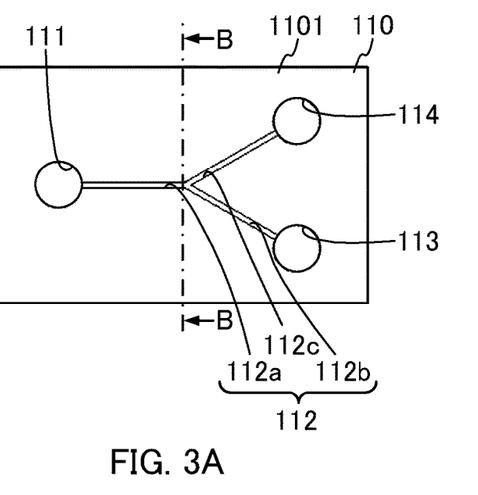
FIG. 3A and FIG. 3B illustrate a configuration of a substrate.
Figure 3B:
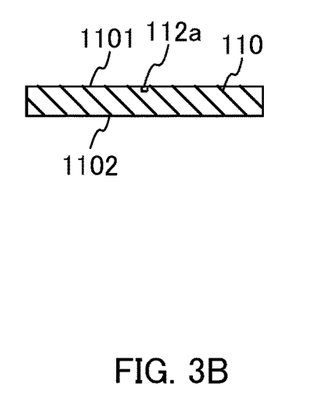
Figure 3C:
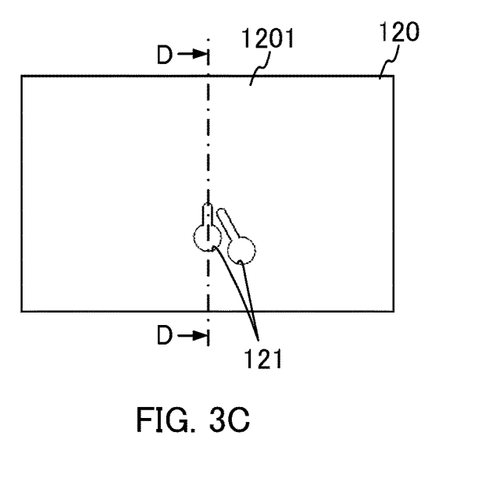
FIG. 3C and FIG. 3D illustrate a configuration of a film.
Figure 3D:
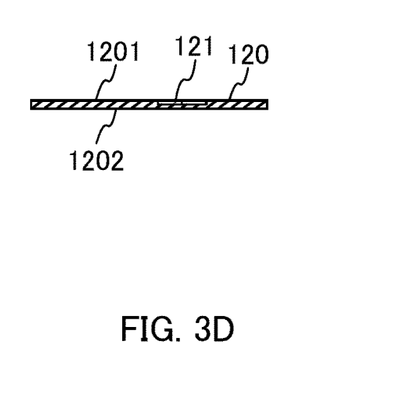

FIG. 3A and FIG. 3B illustrate a configuration of substrate 110 according to the present embodiment. FIG. 3A is a bottom view of substrate 110, and FIG. 3B is a sectional view taken along line B-B of FIG. 3A. FIG. 3C and FIG. 3D illustrate a configuration of film 120 according to the present embodiment. FIG. 3C is a bottom view of film 120, and FIG. 3D is a sectional view taken along line D-D of FIG. 3C.

Substrate 110 is a plate-shaped member on which a through hole or a groove (recess) or both are formed. In the present embodiment, three through holes and three grooves (recesses) are formed on substrate 110. Substrate 110 includes first surface 1101 (rear side surface) and second surface 1102 (front side surface) which are opposite to each other. As illustrated in FIG. 3A and FIG. 3B, first through hole 111, first recess 112, second through hole 113 and third through hole 114 are formed on substrate 110. First recess 112 is a recess through which fluid can move. First recess 112 includes first groove 112a, second groove 112b and third groove 112c. First recess 112 is formed on first surface 1101 of substrate 110.

One end of first groove 112a is communicated with first through hole 111, and the other end of first groove 112a is communicated with one end of second groove 112b and one end of third groove 112c. In addition, the other end of second groove 112b is communicated with second through hole 113, and the other end of third groove 112c is communicated with third through hole 114.

Film 120 described later is joined to first surface 1101 of substrate 110. When the opening of first through hole 111 is closed with film 120, first through hole 111 serves as fluid introduction part 211 for introducing fluid (for example liquid) to channel 212 described later. In addition, when the opening of first recess 112 (first groove 112a, second groove 112b and third groove 112c) is closed with film 120, first recess 112 (first groove 112a, second groove 112b and third groove 112c) serves as channel 212 (first channel 212a, second channel 212b and third channel 212c) through which fluid can move. In addition, when the opening of second through hole 113 is closed with film 120, second through hole 113 serves as first housing part 213 for housing fluid coming from channel 212. Further, when the opening of third through hole 114 is closed with film 120, third through hole 114 serves as second housing part 214 for housing fluid coming from channel 212.

Fluid introduction part 211 is a recess for housing fluid to be introduced to channel 212. The shape and the size of fluid introduction part 211 are not limited as long as fluid can be introduced to fluid introduction part 211 from the outside. Examples of the shape of fluid introduction part 211 (first through hole 111) include a columnar shape and a truncated cone shape. In the present embodiment, fluid introduction part 211 has a columnar shape.

The type of the fluid introduced from fluid introduction part 211 is not limited. For example, the fluid introduced from fluid introduction part 211 is a dispersion liquid of a droplet which is generated from a liquid containing a target material (for example, a cell, a DNA and an enzyme). The type of the solvent of the droplet is not limited as long as the solvent contains a target material, and the solvent is water, for example. In this case, the base phase liquid of the dispersion liquid may be a liquid (for example, oil) having a low solubility relative to the droplet. In addition, the diameter of the droplet is, for example, 5 µm to 200 µm, both inclusive. The method for generating the droplet is not limited, and may be appropriately selected from publicly known methods.

Channel 212 is a branched channel having a branch at the joining part of first channel 212a, second channel 212b and third channel 212c. The number of the branch in channel 212 is not limited, and may be appropriately set in accordance with the use. In the present embodiment, the number of the branch is one. The fluid may be moved in channel 212 by capillarity, or by an external force (for example, a pump). The cross-sectional area and the cross-sectional shape of channel 212 (second recess 121) are not limited as long as the fluid introduced from fluid introduction part 211 can move therethrough. For example, the cross-sectional area and the cross-sectional shape of channel 212 are a nearly rectangular shape whose length (width and depth) of one side is about several micrometers to several millimeters. It is to be noted that the "cross-section of the channel" herein means the cross-section of the channel orthogonal to the movement direction of the fluid. The cross-sectional areas and the cross-sectional shapes of first channel 212a, second channel 212b and third channel 212c may be identical to each other or different from each other. In the present embodiment, the cross-sectional areas and the cross-sectional shapes of first channel 212a, second channel 212b and third channel 212c are identical to each other.

First housing part 213 is a recess for housing the fluid coming from second channel 212b. The shape and the size of first housing part 213 (second through hole 113) are not limited as long as fluid can be housed therein, and may be appropriately designed in accordance with the use. In the present embodiment, first housing part 213 has a columnar shape.

Second housing part 214 is a recess for housing the fluid coming from third channel 212c. The shape and the size of second housing part 214 (third through hole 114) are not limited as long as the fluid can be housed therein, and may be appropriately designed in accordance with the use. In the present embodiment, second housing part 214 has a columnar shape.

The thickness of substrate 110 is not limited. For example, the thickness of substrate 110 is 1 mm to 10 mm, both inclusive. In addition, the material of substrate 110 is not limited, and may be appropriately selected from publicly known resins and glasses. Examples of the resin of substrate 110 include polyethylene terephthalate, polycarbonate, polymethylmethacrylate, polyvinyl chloride, polypropylene, polyether, polyethylene, polystyrene, silicone resin, and elastomer.

Film 120 is a film made of a transparent resin. As illustrated in FIG. 3C and FIG. 3D, film 120 includes third surface 1201 (rear side surface) and fourth surface 1202 (front side surface) which are opposite to each other. Fourth surface 1202 of film 120 is joined to first surface 1101 of substrate 110. A pair of second recesses 121 is formed on third surface 1201 of film 120.

The installation position, the shape, the size and the number of second recess 121 are not limited as long as electrode 130 described later disposed in second recess 121 can appropriately apply an electric field to the inside of channel 212. The number of second recesses 121 may be changed in accordance with the number of electrodes 130 described later, for example. In the present embodiment, two second recesses 121 are formed on third surface 1201. In the present embodiment, second recess 121 is composed of a recess having a columnar shape and a recessed line part communicated with the recess having the columnar shape. The width and the depth of second recess 121 may be appropriately designed in accordance with a desired width and height of electrode 130, the thickness of film 120 and the like. For example, the width of the recessed line part of second recess 121 is 10 µm to 500 µm, both inclusive, and the depth of second recess 121 is 20 µm to 190 µm, both inclusive. Naturally, the depth of second recess 121 is smaller than the thickness of film 120.

An electric field is applied to the inside of channel 212 through film 120 from electrode 130 disposed in second recess 121 of film 120. From the viewpoint of disposing electrode 130 at a position near channel 212 and applying a greater electric field to the inside of channel 212, it is preferable to form second recess 121 such that the distance between the bottom surface of second recess 121 and the bottom surface of channel 212 (the thickness of film 120 at the bottom of second recess 121) is 180 µm or smaller. In addition, from the viewpoint of ensuring the strength of film 120, it is preferable to form second recess 121 such that the distance between the bottom surface of second recess 121 and the bottom surface of channel 212 (the thickness of film 120 at the bottom of second recess 121) is 10 µm or greater.

The thickness of film 120 is not limited, and may be appropriately set in accordance with the type (rigidity) of the resin. For example, the thickness of film 120 is 30 µm to 200 µm, both inclusive.

The type of the resin of film 120 is not limited as long as sufficient adhesion to substrate 110 and properties required during analysis such as a heat resisting property and a reagent resisting property can be ensured. Examples of the type of the resin of film 120 include polyethylene terephthalate, polycarbonate, polymethylmethacrylate, polyvinyl chloride, polypropylene, polyether, polyethylene, polystyrene, silicone resin and the like.

The pair of electrodes 130 is an electrode composed of a positive electrode and a negative electrode for applying an electric field in channel 212 (first recess 112). In addition, electrodes 130 are disposed separately from each other. In addition, as described in detail later, in fluid handling device 100, the pair of electrodes 130, together with channel 212 having the branch part, functions as a sorter part for sorting a droplet which contains a target material, and a droplet which does not contain a target material.

The shape and the installation position of electrode 130 are not limited as long as the above-mentioned function can be ensured. The shape and the installation position of electrode 130 are defined by second recess 121. In plan view of fluid handling device 100, the pair of electrodes 130 is disposed such that the end portions on channel 212 side are disposed along the movement direction of the fluid in channel 212. At this time, in plan view of fluid handling device 100, the pair of electrodes 130 is disposed in one of the regions of the both sides of channel 212. The distance between the end portions of the pair of electrodes 130 (in the present embodiment, the recessed line part of second recess 121) is appropriately set in accordance with the width of channel 212. The distance (minimum distance) between the end portions of the pair of electrodes 130 is, for example, 10 µm to 200 µm, both inclusive. In addition, the number of electrodes 130 may be appropriately set in accordance with the number of the branches of channel 212. In the present embodiment, the number of electrodes 130 is two.

Electrode 130 is formed by solidifying a composition for forming the electrode having fluidity. Electrode 130 may contain conductive ink, or may contain a metal whose fusing point is 200° C. or below (low-melting metal). When electrode 130 contains a conductive ink, the composition for forming the electrode is a conductive ink before removal of solvent. When electrode 130 contains a low-melting metal, the composition for forming the electrode is the above-mentioned metal in a molten state. Examples of the conductive ink include inks for screen printing such as carbon, gold paste, silver paste, and platinum paste. Examples of the low-melting metal include a sodium-potassium alloy, and alloys of zinc, indium, tin, bismuth, lead and the like.

(Manufacturing Method of Fluid Handling Device)

Next, a manufacturing method of fluid handling device 100 according to the present embodiment is described.

First, substrate 110 and film 120 are prepared. The method of forming first through hole 111, first recess 112, second through hole 113 and third through hole 114 on substrate 110 is not limited, and may be appropriately selected from publicly known methods such as a metal molding method and a lithography method. Likewise, the method of forming second recess 121 in film 120 is not limited, and may be appropriately selected from publicly known methods such as a lithography method.

Next, a pair of electrodes 130 is formed in second recess 121 of film 120 by a wet process. For example, it suffices to pour a composition for forming the electrode having fluidity into second recess 121 of film 120, and solidify the composition. The method of pouring the composition into second recess 121 is not limited, and the composition may be poured into second recess 121 by capillarity, or by an external force (for example, a pump). Examples of the composition include a conductive ink, and a low-melting metal in a molten state. When the composition is a conductive ink, the conductive ink can be solidified by removing a solvent contained in the conductive ink. When the composition is a low-melting metal, the low-melting metal can be solidified by setting the temperature of the low-melting metal to a value equal to or lower than a fusing point.

Finally, in a state where first surface 1101 of substrate 110 and fourth surface 1202 of film 120 face each other, substrate 110 and film 120 are joined together. The method of joining film 120 and substrate 110 is not limited. For example, film 120 may be joined to substrate 110 by thermal welding, laser welding, an adhesive agent or the like.

Through the above-mentioned procedure, fluid handling device 100 according to the present embodiment can be manufactured.

(Function of Sorter Part in Fluid Handling Device)

Figure 4A:
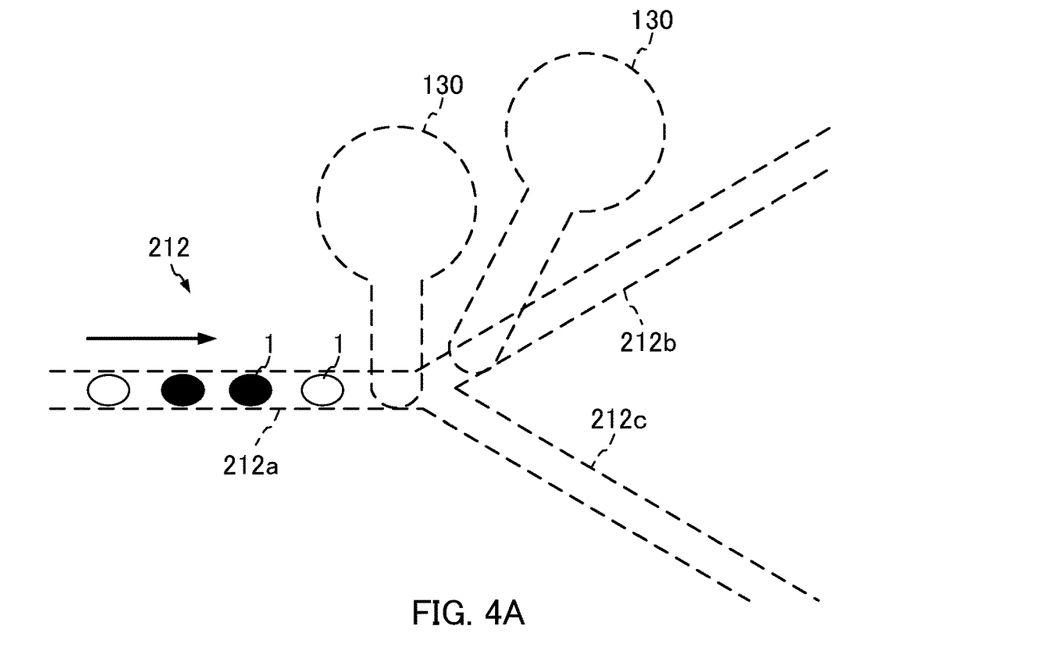
FIG. 4A and FIG. 4B are schematic views for describing a function of the sorter part in the fluid handling device according to the embodiment.
Figure 4B:
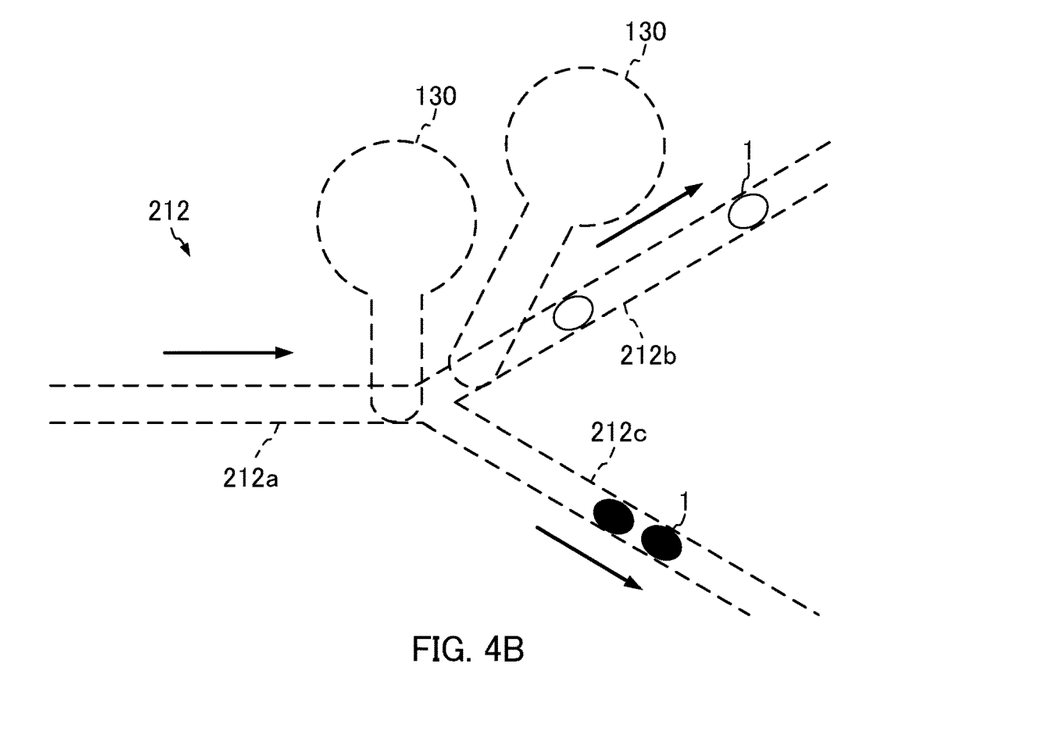

Next, a function of a sorter part (branched channel 212 and electrode 130) in fluid handling device 100 according to the present embodiment is described. FIG. 4A and FIG. 4B are schematic views for describing a function of the sorter part of fluid handling device 100, and are partially enlarged plan views of the region shown by the broken line in of FIG. 2A. It is to be noted that, in FIG. 4A and FIG. 4B, white droplet 1 represents a droplet which contains a target material illustrate, and black droplet 1 represents a droplet which does not contain a target material.

First, when fluid handling device 100 is operated, an electric field is applied to a region around the branch part in channel 212 by a pair of electrodes 130 whose end portions are disposed along channel 212. In plan view of fluid handling device 100, of the regions on the both sides of channel 212, the region in which electrode 130 is disposed is referred to as a strong electric field side region, and the region in which electrode 130 is not disposed is referred to as a weak electric field side region. Second channel 212b is disposed in the strong electric field side region, and third channel 212c is disposed in the weak electric field side region. Liquid containing droplet 1 which contains a target material and droplet 1 which does not contain a target material is introduced from fluid introduction part 211 of fluid handling device 100 into first channel 212a, and the liquid moves in first channel 212a (see FIG. 4A). Next, droplet 1 passes through the electric field. At this time, in the present embodiment, droplet 1 moves to the strong electric field side when droplet 1 contains the target material, and droplet 1 moves to the weak electric field side when droplet 1 does not contain the target material. As a result, droplet 1 which contains the target material and droplet 1 which does not contain the target material are introduced by dielectric migration to respective channels different from each other (see FIG. 4B). Droplet 1 which contains the target material is introduced to second channel 212b communicated with first housing part 213, and droplet 1 which does not contain the target material is introduced to third channel 212c communicated with second housing part 214. In this manner, fluid handling device 100 according to the present embodiment can sort droplet 1 which contains the target material, and droplet 1 which does not contain the target material.

(Effect)

As described above, in fluid handling device 100 according to the present embodiment, the shape of the pair of electrodes 130 is defined by second recess 121, and the pair of electrodes 130 is disposed in second recess 121 formed on film 120. During formation of electrode 130 by a wet process, second recess 121 functions as a guide. In this manner, it is possible to suppress the flow of the unsolidified composition for forming the electrode to an unintended region. Accordingly, even when the distance between the pair of electrodes 130 is small, the pair of electrodes 130 can be disposed without being brought into contact with each other. In addition, the shape and the size of electrode 130 are defined by the shape of second recess 121. With this configuration, electrode 130 having a desired width and a desired depth can be formed with high accuracy. By adjusting the width and the depth of second recess 121, the width and the depth of electrode 130 can be easily adjusted with high accuracy.

Figure 5A:
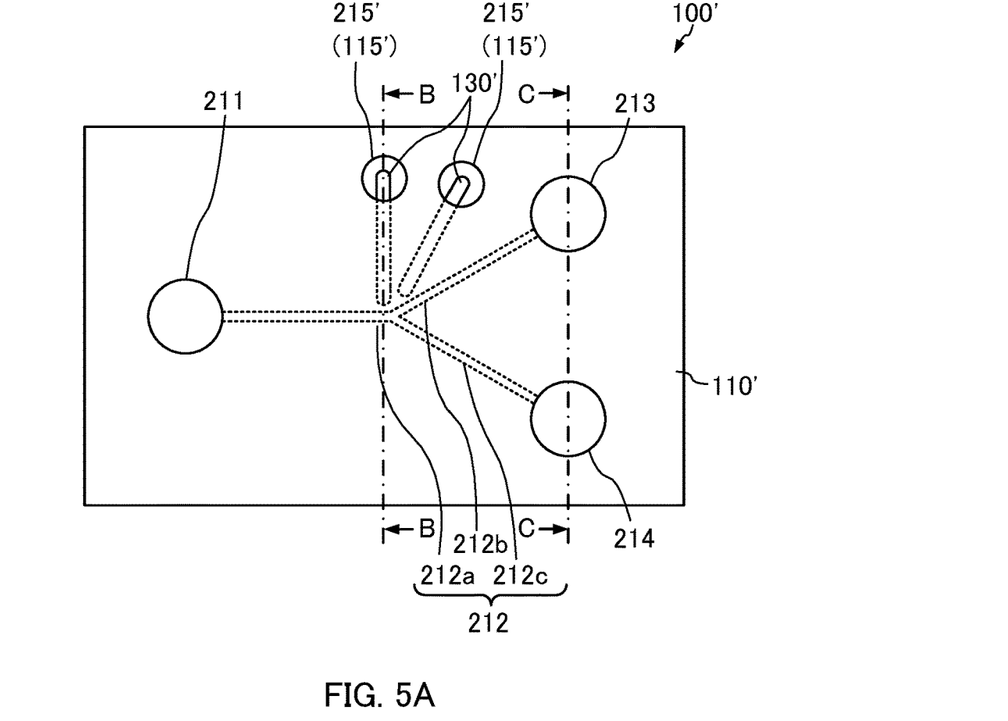
FIG. 5A to FIG. 5C illustrate a configuration of a conventional fluid handling device.
Figure 5B:
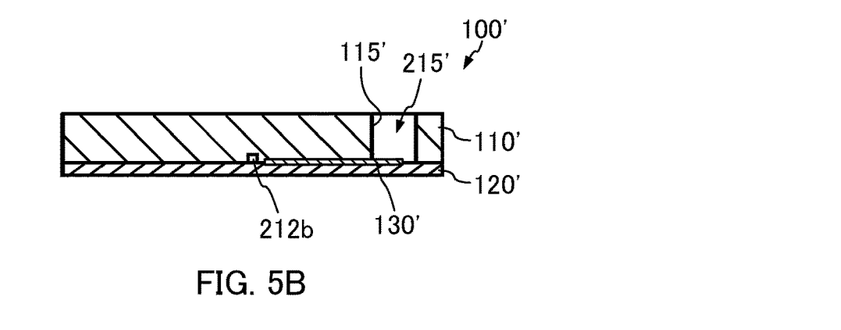
Figure 5C:
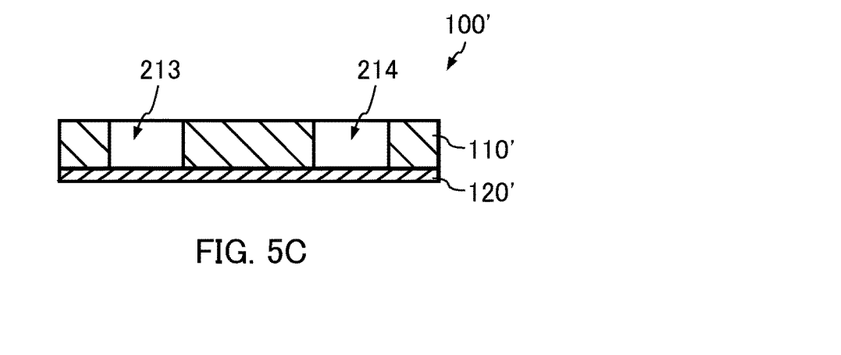

In conventional fluid handling device 100', electrode 130' is formed on fourth surface 1202 (a front side surface which is joined to substrate 110') of film 120', not on third surface 1201 (a rear side surface which is not joined to substrate 110') of film 120'. FIG. 5A to FIG. 5C illustrate a configuration of conventional fluid handling device 100'. FIG. 5A is a plan view of fluid handling device 100', FIG. 5B is a sectional view taken along line B-B of FIG. 5A, and FIG. 5C is a sectional view taken along line C-C of FIG. 5A. Conventional fluid handling device 100' is different from fluid handling device 100 according to the embodiment in that film 120' is not provided with second recess 121, that electrode 130' is formed on fourth surface 1202 (a front side surface which is joined to substrate 110') of film 120', and that two fourth through holes 115' for connecting a connector to electrode 130' are formed on substrate 110'. When the opening of fourth through hole 115' is closed with film 120', fourth through hole 115' serves as third recess 215' for bringing a connector into contact with electrode 130'. In addition, electrode 130' is exposed to the inside of third recess 215'. As illustrated in FIG. 5A and FIG. 5B, in conventional fluid handling device 100', electrode 130' is formed on fourth surface 1202, not on third surface 1201 of film 120'. In the periphery of electrode 130', a gap by the thickness of electrode 130' is formed between substrate 110' and film 120'. Consequently, an end portion of a pair of electrodes 130' cannot be disposed at a position near channel 212.

In contrast, in fluid handling device 100 according to the present embodiment, electrode 130 is disposed on third surface 1201 of film 120, and film 120 is joined to substrate 110 such that fourth surface 1202 faces first surface 1101 of substrate 110. With this configuration, an electric field can be applied to the inside of channel 212 by disposing an end portion of electrode 130 at a position near and below channel 212. Accordingly, in comparison with conventional fluid handling device 100', fluid handling device 100 according to the present embodiment can apply a stronger electric field to the inside of channel 212, and can perform sort of droplets with a higher accuracy. In addition, since electrode 130 is disposed on third surface 1201 of film 120, electrode 130 can be accessed from the rear surface side of fluid handling device 100. Further, the degree of freedom of designing of fluid handling device 100 is increased, and electrode 130 can be densely disposed.

In addition, in fluid handling device 100, an electric field is applied to the inside of channel 212 from a pair of electrodes 130 with film 120 therebetween, and thus, the distance between electrode 130 and channel 212 can be reduced in comparison with a case where a substrate is used in place of film 120. As a result, it is possible to increase the intensity of the electric field to be applied to the inside of channel 212, and perform the sort of droplets with a higher accuracy.

In addition, as described above, in a conventional fluid handling device including a substrate in which a recess for channel is formed on one surface and a recess for the electrode is formed on the other surface, and a film which is joined to the one surface, it is necessary to form a recess for the electrode having a high aspect ratio (the depth with respect to the width of the recess) on the substrate, and as a result, the difficulty of manufacture is increased. In contrast, in fluid handling device 100 according to the present embodiment, electrode 130 is disposed on film 120, and therefore the recess for the electrode having a high aspect ratio is not required to be formed on substrate 110. As a result, fluid handling device 100 including electrode 130 disposed at a position near channel 212 can be easily manufactured.

While fluid handling device 100 introduces dispersion liquid of droplet 1 to fluid introduction part 211 in the present embodiment, the fluid handling device according to the embodiment of the present invention may include a droplet generation part. The configuration of the droplet generation part may be appropriately selected from publicly known configurations. In this case, fluid containing a target material is introduced from fluid introduction part 211.

In addition, while fluid handling device 100 is used for sort of droplet 1 in the present embodiment, the fluid handling device according to the present invention is not limited to this, and may also be used for other purposes than the sort of droplet 1.

INDUSTRIAL APPLICABILITY

The fluid handling device of the present invention is useful as a microchannel chip which is used in medical fields and the like.

REFERENCE SIGNS LIST

1 Droplet
10 Liquid handling device
11 Channel
12 Electrode
100, 100' Fluid handling device
110, 110' Substrate
1101 First surface
1102 Second surface
111 First through hole
112 First recess
212 Channel
112*a* First groove
112*b* Second groove
112*c* Third groove
212*a* First channel
212*b* Second channel
212*c* Third channel
113 Second through hole
213 First housing part
114 Third through hole
214 Second housing part
115' Fourth through hole
215' Third recess
120, 120' Film
1201 Third surface
1202 Fourth surface
121 Second recess
130, 130' Electrode

The invention claimed is:

1. A fluid handling device comprising:
  a substrate including a first surface and a second surface which are opposite to each other, wherein a first recess, configured to allow fluid to flow through the first recess, is formed in the first surface in such a manner that the first recess is recessed from the first surface toward the second surface side;
  a film including a third surface and a fourth surface which are opposite to each other, wherein at least a pair of second recesses is formed on the third surface; and
  at least a pair of electrodes whose shape is defined by the at least the pair of second recesses, the at least pair of electrodes being disposed in the at least pair of second recesses and configured to apply an electric field to an inside of the first recess,
  the film being joined on the substrate in such a manner that the first surface and the fourth surface face each other.

2. The fluid handling device according to claim 1, wherein:
  the film has a thickness of 30 μm to 200 μm, both inclusive; and
  the second recess has a depth of 20 μm to 190 μm, both inclusive, the depth of the second recess being smaller than the thickness of the film.

3. The fluid handling device according to claim 1, wherein an electrode of the at least pair of electrodes includes a conductive ink.

4. The fluid handling device according to claim 2, wherein an electrode of the at least pair of electrodes includes a conductive ink.

5. The fluid handling device according to claim 1, wherein an electrode of the at least pair of electrodes includes a metal whose fusing point is 200° C. or below.

6. The fluid handling device according to claim 2, wherein an electrode of the at least pair of electrodes includes a metal whose fusing point is 200° C. or below.

\* \* \* \* \*